United States Patent
Brunswig et al.

(10) Patent No.: US 7,769,821 B2
(45) Date of Patent: Aug. 3, 2010

(54) SYSTEMS AND METHODS FOR ENHANCED MEASSAGE SUPPORT USING A GENERIC CLIENT PROXY

(75) Inventors: Frank Brunswig, Heidelberg (DE); Markus Cherdron, Muehlhausen (DE); Thomas Gauweiler, Speyer (DE); Martin Hartig, Speyer (DE); Holger Koser, Schonborn (DE); Joerg Weller, Heidelberg (DE)

(73) Assignee: SAP AG, Walldorf (DE)

( * ) Notice: Subject to any disclaimer, the term of this patent is extended or adjusted under 35 U.S.C. 154(b) by 1260 days.

(21) Appl. No.: 11/311,224

(22) Filed: Dec. 20, 2005

(65) Prior Publication Data
US 2007/0143393 A1 Jun. 21, 2007

(51) Int. Cl.
G06F 15/16 (2006.01)
(52) U.S. Cl. ..................................... 709/218
(58) Field of Classification Search ................. 709/203, 709/208, 226, 218
See application file for complete search history.

(56) References Cited

U.S. PATENT DOCUMENTS

| | | |
|---|---|---|
| 6,760,780 B1 * | 7/2004 | Chitturi et al. ............. 709/248 |
| 2004/0068549 A1 * | 4/2004 | Motoyama ................... 709/208 |
| 2004/0215717 A1 * | 10/2004 | Seifert et al. ................ 709/203 |
| 2004/0249944 A1 * | 12/2004 | Hosking et al. ............. 709/225 |
| 2005/0144242 A1 * | 6/2005 | Marston et al. ............. 709/206 |
| 2005/0144284 A1 * | 6/2005 | Ludwig et al. .............. 709/226 |
| 2006/0187850 A1 * | 8/2006 | Ward et al. .................. 370/252 |
| 2006/0188080 A1 * | 8/2006 | Terpstra et al. ......... 379/211.02 |
| 2008/0188180 A1 * | 8/2008 | Rahja ........................ 455/41.2 |

* cited by examiner

*Primary Examiner*—Wing F Chan
*Assistant Examiner*—Tesfay Yohannes
(74) *Attorney, Agent, or Firm*—Mintz, Levin, Cohn, Ferris, Glovsky & Popeo, P.C.

(57) ABSTRACT

Methods and apparatus, including computer program products, are provided for controlling message communication between a first computer and a second computer. An exemplary method includes receiving, at the first computer, one or more messages from the second computer, the messages being stored in a buffer associated with an interface at the first computer. The method also includes calling, by a user interface, the interface at the first computer to retrieve the messages from the buffer. Moreover, the method includes identifying, by the user interface, the messages for presentation based on one or more parameters of the message, and providing the identified messages to the user interface for presentation.

20 Claims, 7 Drawing Sheets

SYSTEMS AND METHODS FOR ENHANCED MEASSAGE SUPPORT USING A GENERIC CLIENT PROXY

BACKGROUND

I. Field of the Invention

The present invention generally relates to messaging and, more particularly, to methods and systems for enhanced message control using a generic client proxy.

II. Background of the Invention

Services, such as web services and applications, may provide a diverse class of information to users. Increasingly, users rely on services to access and interact with applications, obtain product information, order products, access secure data, and perform a variety of other operations. The users may utilize a client system to access services, applications, and information from a back-end server system. The client may include a user interface, such as a web browser, to allow a user to communicate with the server system. Applications may be used at both the client and server to facilitate this communication.

A user may interact with applications at the server using the user interface at the client system. As the user interacts with information at a server, messages may be generated by the server for transmission to the client. The client may retrieve messages as a batch and then process those messages at periodic intervals. However, because the client may receive messages at periodic intervals, the client may not immediately process a received message and, thus, a server may resend the same message to the client. This can lead to repeated processing of the same message, which can decrease system performance. Accordingly, a need exists for system and methods to control and manage message retrieval from a back-end server system, which may include one or more applications.

SUMMARY

The present invention provides methods and apparatus, including computer program products, for controlling messages.

The present invention provides methods and apparatus, including computer program products, for controlling message communication between a first computer and a second computer. An exemplary method includes receiving, at the first computer, one or more messages from the second computer, the messages being stored in a buffer associated with an interface at the first computer. The method also includes calling, by a user interface, the interface at the first computer to retrieve the messages from the buffer. Moreover, the method includes identifying, by the user interface, the messages for presentation based on one or more parameters of the message, and providing the identified messages to the user interface for presentation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
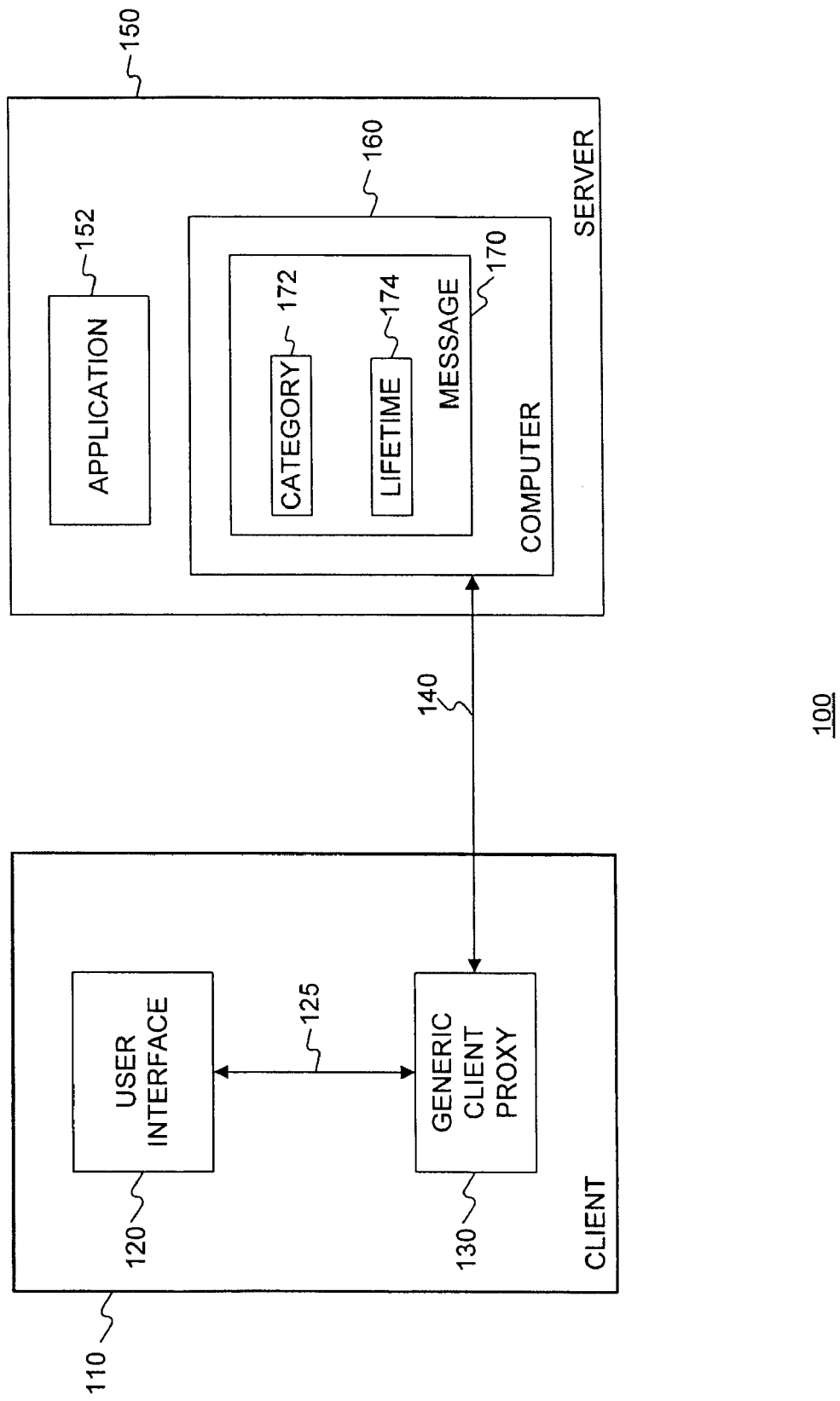
FIG. 1 illustrates a block diagram of exemplary system 100 consistent with certain aspects related to the present invention.

FIG. 1 illustrates a block diagram of exemplary system 100. System 100 may include a client 110, a user interface 120, a generic client proxy 130, network connections 125 and 140, a server 150, and a message 170 including category 172 and lifetime 174.

Referring to FIG. 1, system 100 may be a system allowing a user to access and interact with applications 152 at server 150. While a user interacts with an application, server 150 may generate one or more messages, such as messages 170, indicating, for example, an error, a warning, or a status of the application and/or user interface 120. Server 150 may transmit messages 170 to generic client proxy 130, which may store messages 170 in a buffer. User interface 120 may control processing of messages 170 by retrieving messages 170 from generic client proxy 130, identifying messages 170, and displaying messages 170. User interface 120 may call an interface, such as an application programming interface (API), at generic client proxy 130 of client 150 to control processing of messages 170 or to interact with server 150 and applications 152. User interface 120 may also control the order and manner of processing messages 170 based on parameters included with message 170. As described below, the parameters may indicate, for example, the lifetime of message 170 and category of message 170.

System 100 may be part of an enterprise services framework. An enterprise services framework allows services, such as web applications, to be aggregated to form composite business-level applications. For example, user interface 120 can interact with a service and a corresponding object instantiated by that service at server 150 to provide pricing information to user interface 120.

Client 110 may be a computer capable of executing applications (also referred to as programs). For example, client 110 may include a computer having one or more processors, such as a personal computer. User interface 120 and generic client proxy 130 may be implemented within a client and connected via connection 125. User interface 120 may call generic client proxy 130 using a remote procedure call to an API at generic client proxy 130, although other types of calls could be used.

Client 110 may also include a plurality of computers, with generic client proxy 130 included within a first computer connected by a network connection or direct link to user interface 120 included within another computer. Each of generic client proxy 130 and user interface 120 may also be implemented in a distributed manner using a plurality of computers.

User interface 120 may allow users to interact with applications, such as services and web services, through generic client proxy 130. As described below, generic client proxy 130 may provide user interface 120 explicit control of message processing. User interface 120 may be a program capable of being executed by client 110. For example, user interface 120 may be implemented using Web Dynpro technology (commercially available from SAP AG, Walldorf, Germany) or Asynchronous Java Script and XML (referred to as AJAX).

User interface 120 may also operate with or include a web browser to allow a user to interact with applications at server 150, which may be provided through generic client proxy 130. User interface 120 may present messages 170 to a user using, for example, a display and/or audio devices. In this manner, user interface 120 may include a graphical user interface having buttons, edit fields, tables, or the like.

Network connections 125 and 140 may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide connections 125 and 140 using bi-directional, unidirectional, and/or dedicated communication links.

Generic client proxy 130 may provide messaging capabilities, including automatic propagation of message 170 between server 150 and client 110. Generic client proxy 130 may include an API. Moreover, the API may be implemented using a model-based run-time environment, one example of which is Advanced Business Application Programming (ABAP), commercially available from SAP AG, although any other environment may be used. The API may be implemented as part of a service oriented architecture (SOA), although any other architecture may be used. An example of a SOA is the Enterprise Services Framework (ESF) commercially available from SAP AG, Walldorf, Germany. The term "SOA" may also be used to refer to a "distributed objects" architecture, such as CORBA (Common Object Request Broker Architecture) and DCOM (Distributed Component Object Model).

When a user through user interface 120 requests information, such as information related to a product presented in a web browser, server 150 may provide the information through generic client proxy 130. Server 150 may also provide messages 170 associated with the information, state of the application, and user input to generic client proxy 130. For example, server 150 may send error messages 170 to generic client proxy 130 upon detection of an error. As described below, user interface 120 and generic client proxy 130 may define rules for processing message 170 in a standardized manner.

Server 150 may include one or more processors, such as a computer, with applications 152. Applications 152 may include an application service (e.g., an application used for purchasing), a web service, a database service, or any other appropriate program. These applications 152 may provide a service, such as purchasing and payroll.

Server 150 may also include components of a distributed system architecture such as an integration and application platform, databases, libraries, applications, and the like. An exemplary integration and application software platform that may be used is Exchange Infrastructure XI, commercially available from SAP AG, Walldorf, Germany, although other integration and application software may be used instead. Information, such as product information and services, provided by server 150 may be supported, for example, with the Enterprise Service Framework, AdaptiveRFC (commercially available from SAP AG) although other frameworks may be used.

Although described with respect to a client-server and an enterprise services framework system, system 100 can utilize any other architecture or framework.

Moreover, server 150 may generate message 170 for transmission to client 110. Message 170 may describe the state of application 152 at server 150, or describe the state of an object associated with application 152 at server 150. Message 170 may also provide information to client 110, user interface 120, and generic client proxy 130. An "object" may refer to a software bundle of variables (e.g., data) and related methods. For example, in object-oriented programming, an object may be a concrete realization (instance) of a class that consists of data (also referred to as information) and the operations associated with that data. A user of user interface 120 may access server 150 to access a purchase order, the purchase order and related method correspond to an object. Message 170 may provide information regarding the state of the purchase order and/or indicate an error with the purchase order.

Message 170 may include parameters such as category 172 and lifetime 174. Using these parameters, generic client proxy 130 may control, for example, whether to provide message 170 to user interface 120, when to provide message 170 to user interface 120, and the duration for providing message 170 to user interface 120. Additional parameters may also be used to control message handling at generic client proxy 130 and subsequent processing by user interface 120. For example, message 170 may include one or more parameters that user interface 120 uses to relate message 170 to an object, such as the name of the object.

Category 172 may indicate the type of information message 170 provided and why message 170 was generated. Category 172 may be represented as an array, an integer value, a string, and other data storage methods including object oriented programming. Category 172 may indicate the type of information that message 170 includes, such as an error, a warning, an indicator of success, or information regarding the state of application 152 (or user interface). Exemplary categories 172 may indicate a format error, a currency conversion error, a processing error, a business conflict, a user interface error, a software error generated to indicate the status of application 152 (e.g. a software bug that is known and classified according to system behavior), and an infrastructure error. For example, as a user interacts with application 152, such as a purchasing application 152 at server 150, message 170 may be generated to indicate a format error (e.g., a timestamp field is not valid) a processing error (e.g., when a user attempts to change a read only value associated with application 152 or provided an incorrect credit card number to make a purchase using application 152), or a business conflict (e.g., when a user requests a delivery date that is unavailable). While exemplary message categories 172 have been discussed, message 170 may include other message categories 172.

Lifetime 174 may be a parameter that defines the lifetime of message 170. Exemplary message lifetimes 174 include permanent and present once. Message 170 having permanent lifetime and/or present once lifetime may be received by user interface 120, so that the corresponding information from the message can be presented to a user. Message 170 having lifetime 174 of present once may be presented by user interface 120 to a user only once. For example, a message having lifetime 174 present once may indicate to a user that a value entered in a purchase order is invalid. The message may be presented once and persist until the user provides a corrected value. In this manner, messages having lifetime 174 of present once may trigger a user to update a value.

Message 170 having lifetime 174 of permanent may be presented as long as message 170 exists and may be controlled by, for example, application 152 running at server 150 that is associated with message 170. Message 170 having lifetime 174 of permanent may be displayed in a manner that visually associates message 170 to a related item displayed on user interface 120.

Message 170 may be displayed by user interface 120 so that it is close to a corresponding item, which may also be highlighted. An item may be an instance of an object in application 152 that user interface 120 presents to a user. User interface 120 may use a table format, such that a specific row or column of a table displayed on user interface 120 corresponds to the item associated with message 170. For example, user interface 120 may display an item requesting a credit card number for a purchase order. When the user enters the credit card number, application 152 at server 150 may verify that the number is valid. If the number is not valid, message 170 may be generated and transmitted to user interface 120 to indicate the error to a user. The message may be displayed next to the field where the user entered the incorrect credit card number, and the incorrect credit card number may be highlighted.

Messages 170 having lifetime 174 of permanent that are not related to an item displayed on user interface 120 may also be of interest to a user and therefore may also be displayed on user interface 120. Although present once and permanent are parameters of lifetime 145 described above, other indications of the lifetime of a message may be used.

Figure 2:
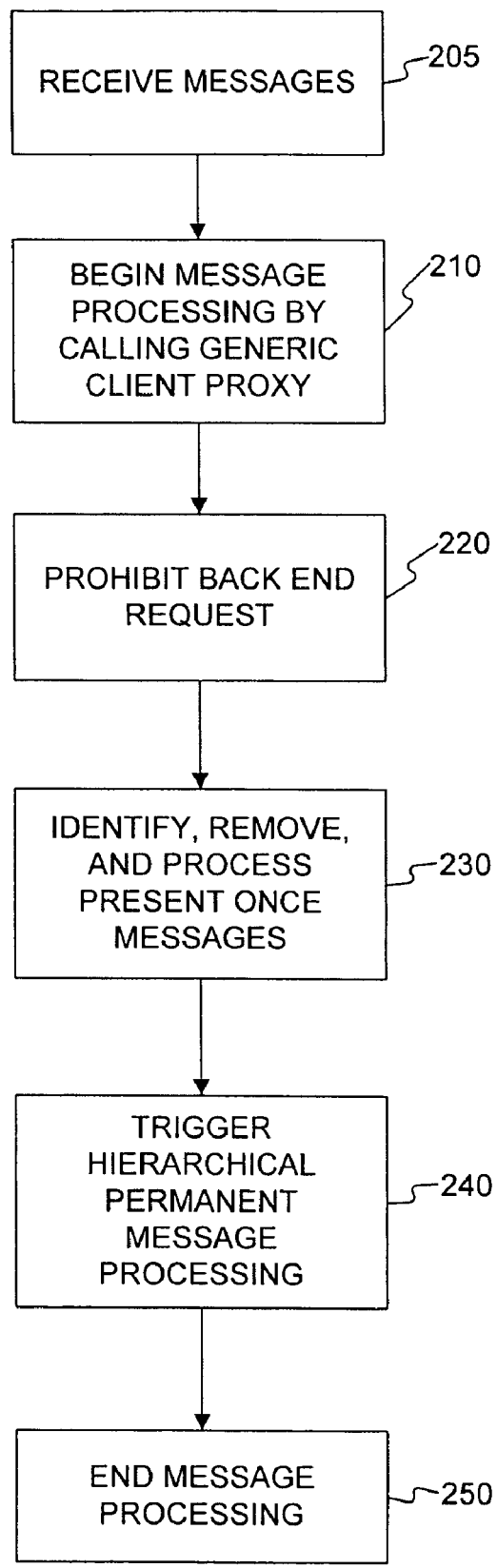
FIG. 2 illustrates an exemplary flow chart of method 200 for processing messages consistent with certain aspects related to the present invention.

FIG. 2 illustrates an exemplary flow chart of method 200 for processing messages. Referring to FIGS. 1 and 2, method 200 may allow control of messages 170 to allow enhanced processing by user interface 120. Client 110 may receive messages 170 that are generated by server 150 (step 205). Generic client proxy 130 may store messages 170 in a buffer as they are received. User interface 120 may begin message processing using, for example, a call to an API at generic client proxy 130 (step 210). The call may be implemented using known formats, such as RPC or SOAP. The beginning of the call from user interface 120 to generic client proxy 130 initiates control of message processing (e.g., when user interface 120 receives, removes, resets, clears, reads, searches, retrieves, updates, displays, or deletes messages 170). For example, user interface 120 may retrieve and display messages 170 from generic client proxy 130 using one or more user interface components designed to search for messages having given properties such as a certain category or a lifetime. User interface 120 may also trigger removal of messages 170 having lifetime 174 present once after displaying message 170. Message 170 may be displayed for a period of time (e.g., until a user interacts with user interface 120, or until user interface 120 removes the object associated with message 170).

Generic client proxy 130 may prohibit user interface 120 from directly requesting information from server 150 (step 220). Generic client proxy 130 may prohibit the direct requests from user interface 120 to server 150 by intercepting calls to server 150. For example, generic client proxy 130 may receive an inbound call from user interface 120 to server 150. In response to the inbound call, generic client proxy 130 generates its own outbound call to server 150. Alternatively, user interface 120, through generic client proxy 130, may continue to make requests for information from server 150 by copying messages into a second message buffer.

User interface 120 may identify and remove message 170 having lifetime 174 of present once, from a message buffer at generic client proxy 130, and then process messages 170 having a lifetime 174 of present once (step 230). The processed present once messages 170 may be provided to user interface 120 by generic client proxy 130, so that user interface 120 can further process and, if necessary, present the information from message 170 to a user.

At step 240, generic client proxy 130 may initiate hierarchical processing for messages 170 with a lifetime 174 parameter of permanent. Hierarchical processing may include determining whether items are currently presented on user interface 120 and whether the presented (or displayed) items have an associated object at a server that corresponds to messages 170 with a permanent lifetime 174. If message 170 having a lifetime 174 of permanent relates to an item being presented at user interface 120, message 170 may be processed and presented on user interface 120. User interface 120 may retrieve a list of messages that have lifetime permanent 174 from generic client proxy 130. User interface 120 may then search messages 170 having lifetime permanent to identify messages 170 that are related to items that are presented on user interface 120. For example, user interface components may search messages 170 to identify messages 170 having parameter(s) indicating a given category and object name.

Messages 170 having a permanent lifetime 174 related to items that are not currently presented by user interface 120 may be processed after handling all user interface components. For example, after user interface 120 retrieves and displays messages 170 having lifetime present once and retrieves and displays messages 170 having lifetime permanent that are associated with an item being presented on user interface 120, user interface 120 may display all messages 170 having lifetime permanent that are not related to items displayed. These messages 170 may be displayed in a designated message box of user interface 120. Although the description refers to items and components displayed at a user interface, the items or components may also constitute an object.

Messages 170 having a lifetime 174 of permanent may be immutable, such that these messages 170 may not be removed from a buffer at client 110. When messages are immutable, message 170 is always available for presentation when user interface 120 presents related objects. For example, message 170 having lifetime 174 permanent may be for an object that is not currently being presented. As soon as user interface 120 presents the item corresponding to the object, message 170 may be presented along with the item. For example, message 170 having lifetime permanent that is not related to an item being displayed may be presented in a designated message box. Once user interface 120 presents the related item, message 170 having lifetime permanent may be presented in a table within a row or column for the item, and the item may be highlighted. Server 150 may be responsible for clearing messages 170 having lifetime 174 of permanent from message buffer(s) at client 110.

At step 250, user interface 120 may end message processing through generic client proxy 130. If requests to server 150 were prohibited, user interface 120 may then resume making requests for information directly to server 150.

Figure 3:
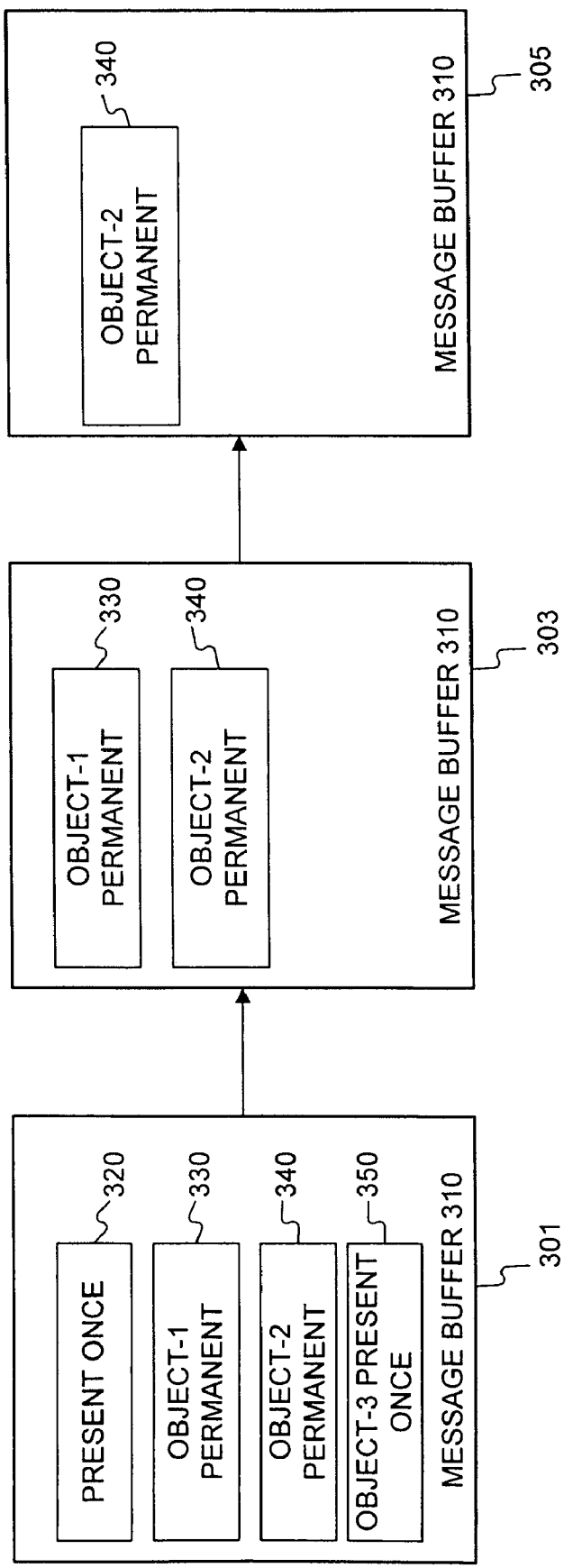
FIG. 3 illustrates contents of message buffers 310 during method 200 consistent with certain aspects related to the present invention.

FIG. 3 illustrates the contents of exemplary message buffer 310 when processed according to the method of FIG. 2. Message buffers 310 may store messages before (301), during (303), and after (305) message processing. Message buffer 310 may be located in generic client proxy 130, although it can be located anywhere and in multiple locations. User interface 120 may present messages 170 to a user of user interface 120 related to a plurality of items on a screen, the items being related to objects of application 152 at a server.

Message buffer 310 at step 301 illustrates an exemplary message buffer 310 including messages 170 at the beginning of message processing. At the beginning of message processing, message buffer 310 may contain four messages 170. These messages 170 may have been sent to generic client proxy 130 by server 150. The present once message 320 may have a lifetime 174 of present once. The object-1 permanent message 330 and the object-2 permanent message 340 may be messages 170 having a lifetime 174 of permanent. The object-3 present once message 350 may be a message 170 for having a lifetime 174 of present once.

After prohibiting server requests (step 220), messages 170 having a lifetime 174 of present once are processed and cleared from message buffer 310 (step 230). For example, user interface 120 may process and clear from message buffer 310 at generic client proxy 130, the present once message 320 and the object-3 present once message 350. User interface 120 may also delete all messages 170 having lifetime present once.

Messages 170 may include, for example, a flag (also referred to as a processed flag) to indicate that the messages 170 have been processed by user interface 120. To avoid unintentional repeated handling of a message during message processing, a copied message buffer or, alternatively, a processed flag may be used, as discussed below with respect to FIG. 4. If client 110 uses a copied message buffer, messages 170 remain in a message buffer that is synchronized with a server message buffer. Alternatively, if client 110 uses a processed flag, user interface 120 may set the processed flag to true once a user interface component handles message 170. Resetting the processed flag to true allows messages 170 having a lifetime of permanent to be processed again by user interface 120. The result is message buffer 310 at step 303, which contains object-1 permanent message 330 and object-2 permanent message 340.

Next, generic client proxy 130 may initiate hierarchical processing for message 170 having a lifetime 174 of permanent (step 240). The contents of buffer 310 at step 303 include object-1 permanent message 330 and object-2 permanent message 340.

When object-1 permanent message 330 relates to an object which has an item currently being presented at user interface 120 and object-2 permanent message 340 does not relate to an item currently being presented at user interface 120, hierarchical message processing may be initiated, such that object-1 permanent message 330 may be processed and marked with a processed flag as processed in message buffer 310 at step 303 before any processing of object-2 permanent message 340. However, permanent messages may not be cleared from the message buffer by user interface 120. Instead, server 150 may send a message to generic client proxy 130 indicating that certain message(s) are to be deleted. For example, server 150 may send a delete message to generic client proxy with flag(s) indicating that the delete message is not a new message and to delete a permanent message with a given identifier. Generic client proxy 130 may then clear both the delete message and the message identified by the delete message from message buffer 310.

After processing message 330, the only remaining unprocessed message in message buffer 310 at step 303 is object-2 permanent message 340. After processing messages 170 remaining in message buffer 310, the copied message buffer will not contain unprocessed messages when processing ends at step 250. However, messages 170 having lifetime 174 permanent that have been processed may remain in message buffer 310. Messages 170 having lifetime 174 may include a processed flag, which may be reset (e.g., to indicate unprocessed) after user interface 120 processes messages in message buffer 310. In this manner, messages 170 having lifetime permanent can be preserved and processed again at a later time. Server 150 may send a message to generic client proxy 130 indicating that messages 170 having lifetime 174 permanent may be deleted once the message is no longer needed.

Figure 4:
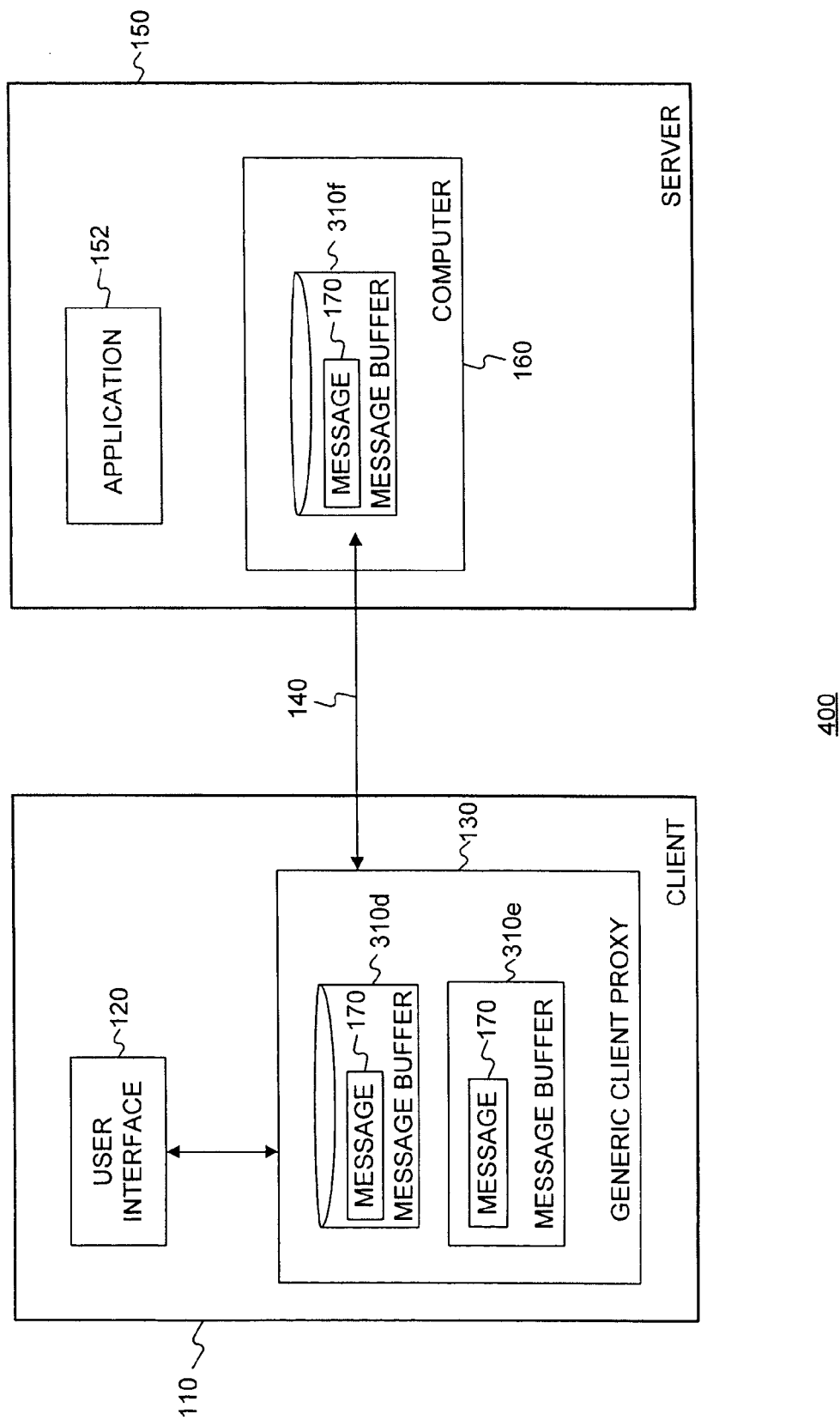
FIG. 4 illustrates system 400, which is another exemplary system implementation consistent with certain aspects related to the present invention.

FIG. 4 illustrates system 400 for processing messages. System 400 is similar to system 100, but further includes message buffers 310*d* and 310*e* for storing messages at client 110. Additionally, server 150 includes message buffer 310*f* for storing messages 170. Messages 170 may be transmitted between message buffer 310*f* at server 150 and message buffer 310*d* at client 110. When generic client proxy 130 receives messages 170, generic client proxy 130 may store messages 170 in message buffer 310*d*. Message buffer 310*d* and message buffer 310*f* may be synchronized to ensure that messages are transmitted and received properly. Generic client proxy 130 may also include message buffer 310*e* for storing copies of messages in message buffer 310*d*, as described with respect to FIG. 5.

Figure 5:
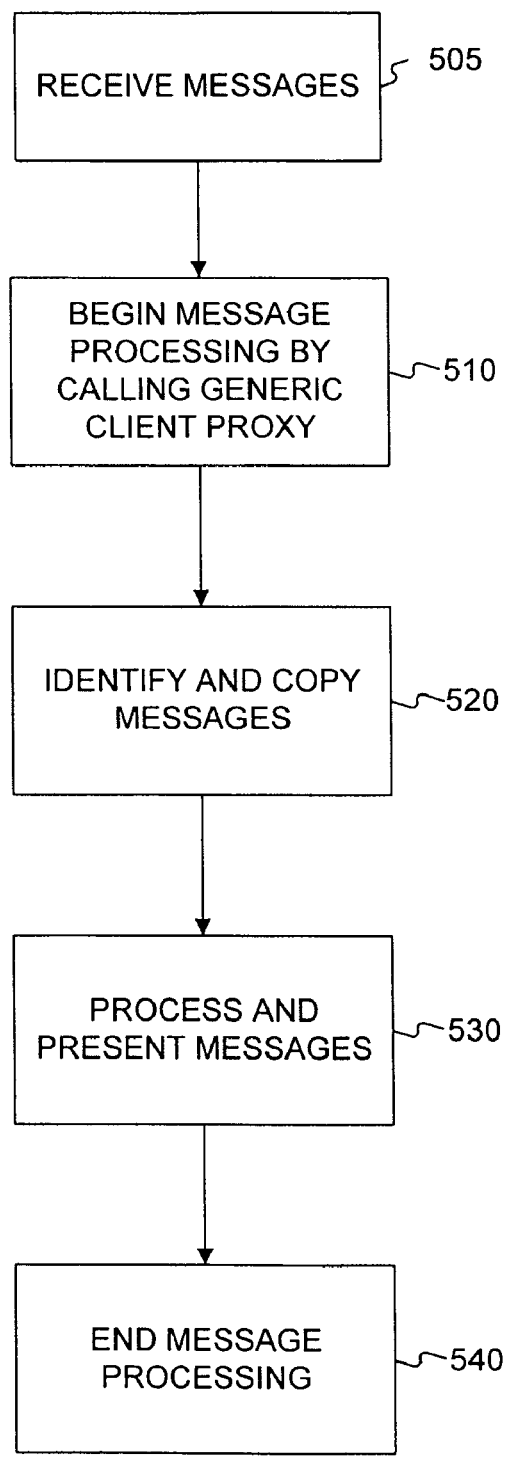
FIG. 5 illustrates a flowchart of an exemplary method 500 for processing messages consistent with certain aspects related to the present invention.

FIG. 5 illustrates a flowchart of an exemplary method 500 for processing messages. Referring to FIGS. 4 and 5, client 110 may receive messages 170 that are generated by server 150 (step 505). Generic client proxy 130 may store messages 170 in message buffer 310*d* as they are received. User interface 120 may begin message processing using, for example, a RPC function call to an API at generic client proxy 130 (step 510). The API call to generic client proxy 130 may prohibit user interface 120 from making direct requests for information to server 150, as described above with respect to step 220.

Generic client proxy 130 may identify and copy messages 170 from message buffer 310*d* to message buffer 310*e* to facilitate retrieval of messages 170 related to an item (step 520). When message 170 is copied by generic client proxy 130 from buffer 310*d* to message buffer 310*e*, user interface 120 may then retrieve all messages 170 from message buffer 310*e* at generic client proxy 130. User interface 120 may identify messages using a plurality of components. Each component may be used by user interface 120 to retrieve messages 170 associated with the different objects of application 152 at server 150. User interface components may retrieve, display, and clear message buffer 310*e* of their corresponding messages 170 sequentially, such that after a first user interface component processes messages 170 in buffer 310*e*, a second user interface component processes messages 170 corresponding to the second object of application 152 running at server 150. Messages 170 may store parameters indicating to which object of application 152 the message 170 is associated with. User interface components may request messages 170 based on parameters, such as the name of an associated object or category 172. The application program interface may receive a parameter from the user interface component, search for messages 170 in message buffer 310*d*, and return to the user interface component messages 170 having the desired parameter. For example, a first user interface component may retrieve messages related to credit card verification. These messages may be displayed to a user and cleared from message buffer 310*e*. Then, a second user interface component may retrieve messages related to an order quantity, display the messages on user interface 120, and clear the messages from message buffer 310*e*. Messages 170 (or portions therein) related to the identified objects may be presented at user interface 120, so it can be displayed to a user.

While user interface 120 processes messages 170 in message buffer 310*e*, message buffer 310*d* may continue to receive messages 170 from server 150. Message buffer 310*d* therefore stores messages 170 for subsequent processing by user interface 120.

Messages 170 may be processed at step 530 by, for example, removing, identifying, and presenting by user interface 120 present once messages as described with respect to step 230 or, alternatively, initiating hierarchical permanent message processing as described with respect to step 240.

Message processing may end once the user interface components have retrieved and displayed messages present once messages (step 540). At this point, any remaining messages 170 in message buffer 310*e* do not relate to items being presented on user interface 120. These remaining messages 170 in message buffer 310*e* may optionally be processed by a component of user interface 120, including clearing messages 170 from message buffer 310*e*. Messages 170 may also be cleared from message buffer 310*d* by user interface 120 using generic client proxy 130 if the message 170 has a lifetime 174 of present once. Messages 170 having a lifetime 174 of permanent may not be cleared from message buffer 310*d*, but such messages may have their processed flag reset by user interface 120 to allow processing again.

Figure 6:
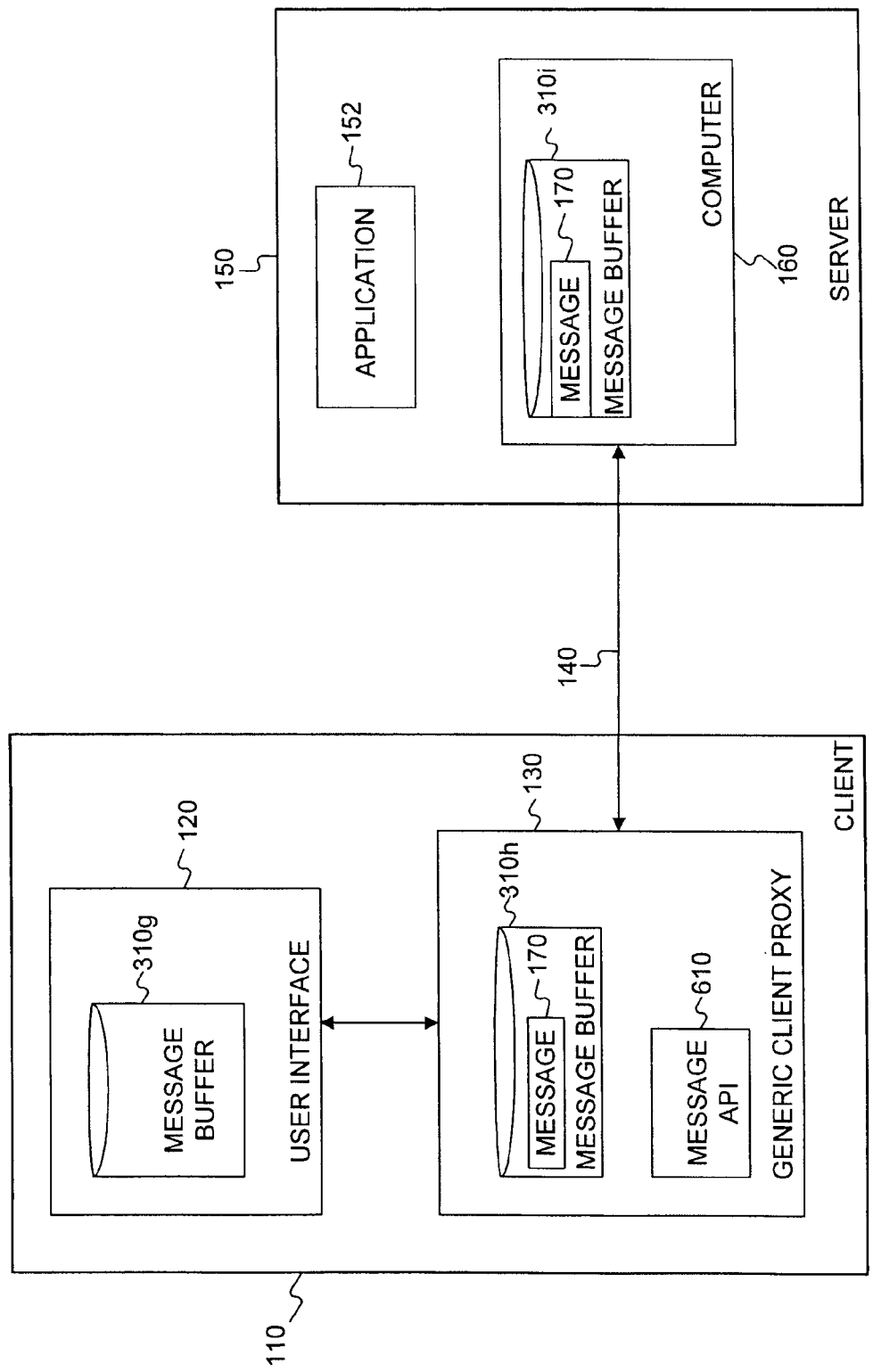
FIG. 6 illustrates system 600, which is another exemplary system implementation consistent with certain aspects related to the present invention.

FIG. 6 illustrates system 600 for processing messages. System 600 is similar to system 100, but includes message buffers 310*g*-310*i* and API 610. Message buffer 310*g* may allow user interface 120 to retrieve a batch of messages 170 for processing and presentation to a user. User interface 120 may retrieve a batch of messages at a time determined by user interface 120. In this manner, user interface 120 may control the timing for message retrieval. For example, user interface may initiate message retrieval from a buffer after a user changes a value on user interface 120 and that value is sent to server 150. Initiating message retrieval through generic client proxy 130 after such a change allows user interface 120 to check for new messages 170 when server 150 is likely to have sent (also referred to as pushed) messages 170 to generic client proxy 130.

Generic client proxy 130 may also include API 610. API 610 may provide a messaging system that can copy on demand of user interface 120 and that does not influence synchronization between message buffer 310*h* and message buffer 310*i*, as described with respect to FIG. 7. Alternatively, API 610 may be included within user interface 120. When that is the case, user interface 120 may maintain greater control over message 170 processing, when compared to having the API at generic client proxy 130.

Figure 7:
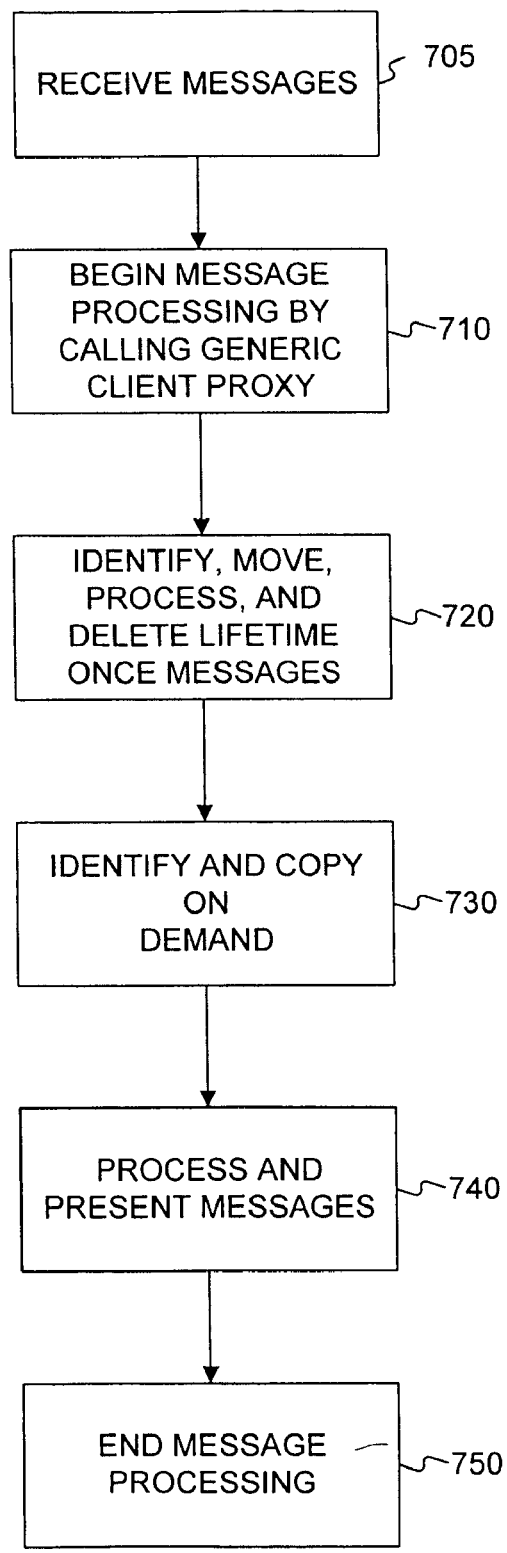
FIG. 7 illustrates a flowchart of an exemplary method 700 for processing messages consistent with certain aspects related to the present invention.

FIG. 7 illustrates a flowchart of steps 700 for processing messages using system 600. Referring to FIGS. 6 and 7, client 110 may receive messages 170 that are generated by server 150 (step 705). Generic client proxy 130 may store messages 170 in message buffer 310*h* as they are received. User interface 120 and generic client proxy 130 may begin message processing at any time, such as when demanded by user interface 120 (step 710). During message processing, requests to a server 150 may or may not be prohibited.

User interface 120 may identify, move, process, and delete messages 170 from message buffer 310*h* that have lifetime 174 of present once (step 720). User interface 120 may move messages 170 having lifetime present once from message buffer 310*h* to message buffer 310*g* using API 610. Once messages 170 having lifetime present once are moved, message buffer 310*h* may not contain any messages 170 having lifetime present once. User interface may then process (e.g., identify, displaying, delete) messages 170 having lifetime present once in message buffer 310*g*. User interface 120 may clear messages 170 from message buffer 310*g* as the messages 170 are processed.

Messages 170 remaining in message buffer 310*h* may be copied to message buffer 310*g* on demand from user interface 120 (step 730). Messages 170 remaining in message buffer 310*h* may be messages 170 having lifetime 174 permanent, and may not be deleted by user interface 120. User interface 120 may demand that some or all messages 170 (e.g., those messages that are related to given object of application 152 at server 150) are copied from message buffer 310*h* to message buffer 310*g* by generic client proxy 130.

User interface 120 may then process remaining messages 170 in message buffer 310*g* (step 740), as described above with respect to step 530. User interface 120 may process all messages 170 in message buffer 310*g* and/or message buffer 310*h*. Alternatively, user interface 120 may only process messages 170 in message buffer 310*g* that are related to an item being presented by user interface 120. Once user interface 120 has processed the messages 170 in message buffer 310*g*, message processing may end (step 750). If user interface 120 demands a restart of message processing, then control would return to step 710.

The systems and methods disclosed herein may also be utilized during software design time, such that application 152 at server 150 may transmit error, warning, success, and informative messages 170 as a developer creates objects and associations between the objects. For example, application 152 may include generic objects for performing tasks, such as a first object for verifying an accurate credit card number and a second object for verifying a shipping address. The developer may choose to associate the first and second objects to ensure that the shipping address matches the address on file for the credit card number. If a user is purchasing a product and the addresses do not match, an error message 170 may be sent to the user.

Moreover, the systems and methods disclosed herein may be used at runtime with application 152 that generates different messages based on a user's interaction with a user interface and the application 152. For example, a user may be required to log into application 152 (or system), and may be given only read access to restricted data fields of application 152. If the user attempts to modify a read only data field, an error message may be sent at runtime from server 150 to generic client proxy 130. However, an administrator may be given read and write permission to modify the restricted data fields, in which case server 150 may not generate an error message, or may generate a success message.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments.

Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A method for controlling message communication between a first computer and a second computer, comprising:
   receiving, at the first computer including a user interface and a client proxy, one or more messages from the second computer, the one or more messages being stored in a buffer associated with an interface at the client proxy, the client proxy controlling whether to provide the one or more messages to the user interface;
   calling, by the user interface, the interface at the client proxy to retrieve the one or more messages from the buffer;
   identifying, by the user interface, an identified message of the one or more messages for presentation based on one or more parameters of the identified message; and
   providing, by the client proxy, the identified message to the user interface for presentation.

2. The method of claim 1, wherein the second computer generates the one or more messages to indicate an error, a warning, or a status of an application running at the second computer.

3. The method of claim 1, wherein the one or more messages indicate an error, a warning, or a success of establishing an association among objects of an application, the application running at the second computer.

4. The method of claim 1, wherein calling the interface comprises copying the one or more messages stored in the buffer to a second buffer, the second buffer being associated with the user interface.

5. The method of claim 1, wherein identifying the identified message comprises determining whether each of the one or more messages is associated with an item presented by the user interface.

6. The method of claim 1, wherein the one or more parameters comprise a category of the identified message.

7. The method of claim 6, wherein: the category of the message comprises at least one of a format error, a currency conversion error, a processing error, a business conflict, and a user interface error.

8. The method of claim 1, wherein the one or more parameters of the identified message comprise a lifetime of the identified message.

9. The method of claim 8, wherein the lifetime of the identified message comprises at least one of present once and permanent.

10. The method of claim 1, further comprising:
    deleting, by the user interface, a first set of the one or more messages having a first lifetime of present once;
    resetting, by the user interface, a flag associated with a second set of the one or more messages having a second lifetime of permanent;
    receiving, by the interface, an instruction from the second computer to delete the second set of messages having the second lifetime of permanent; and
    deleting, by the interface, the second set of messages identified by the instruction.

11. A computer-readable storage medium that stores a set of instructions which, when executed, performs a method for controlling message communication between a first computer and a second computer, the method comprising:
    receiving, at the first computer including a user interface and a client proxy, one or more messages from the second computer, the one or more messages being stored in a buffer associated with an interface at the client proxy, the client proxy controlling whether to provide the one or more messages to the user interface;
    calling, by the user interface, the interface at the client proxy to retrieve the one or more messages from the buffer;
    identifying, by the user interface, an identified message of the one or more messages for presentation based on one or more parameters of the identified message; and
    providing, by the client proxy, the identified message to the user interface for presentation.

12. The computer-readable storage medium of claim 11, wherein the second computer generates the one or more messages to indicate an error, a warning, or a status of an application running at the second computer.

13. The computer-readable storage medium of claim 11, wherein the one or more messages indicate an error, a warning, or a success of establishing an association among objects of an application, the application running at the second computer.

14. The computer-readable storage medium of claim 11, wherein calling the interface comprises copying the one or more messages stored in the buffer to a second buffer, the second buffer being associated with the user interface.

15. The computer-readable storage medium of claim 11, wherein identifying the identified message comprises determining whether each of the one or more messages is associated with an item presented by the user interface.

16. The computer-readable storage medium of claim 11, wherein the parameters comprise a category of the identified message.

17. The computer-readable storage medium of claim 16, wherein the category of the identified message comprises at least one of a format error, a currency conversion error, a processing error, a business conflict, and a user interface error.

18. A system comprising:

a first computer comprising at least one processor and at least one memory storing instructions that, when executed by the at least one processor, cause the first computer to perform operations comprising:

receiving one or more messages generated by a second computer, the one or more messages pertaining to interactions of a user using a user interface at the first computer with one or more of applications and data objects implemented at the second computer;

storing the one or more messages in a buffer of a client proxy implemented at the first computer, the buffer being associated with a client proxy interface of the client proxy;

calling, by the user interface, the client proxy interface to cause the client proxy interface to retrieve the one or more messages from the buffer;

processing the one or more messages by the user interface, the processing comprising identifying an identified message of the one or more messages for presentation based on one or more parameters of the identified message; and providing, by the client proxy, the identified message to the user interface for presentation.

19. The method of claim 1, further comprising:

intercepting, at the client proxy, a call directed from the user interface to a server hosted on the second computer, the intercepting comprising prohibiting the user interface from directly requesting information from the server;

generating, at the client proxy, an outbound call to the server; and sending, from the client proxy to the server, the outbound call, the one or more messages received from the second computer by the first computer being generated by the server in response to the outbound call.

20. The method of claim 1, further comprising the client proxy controlling when the one or more messages are provided to the user interface and a duration for which the one or more messages are provided to the user interface.

* * * * *